… … …

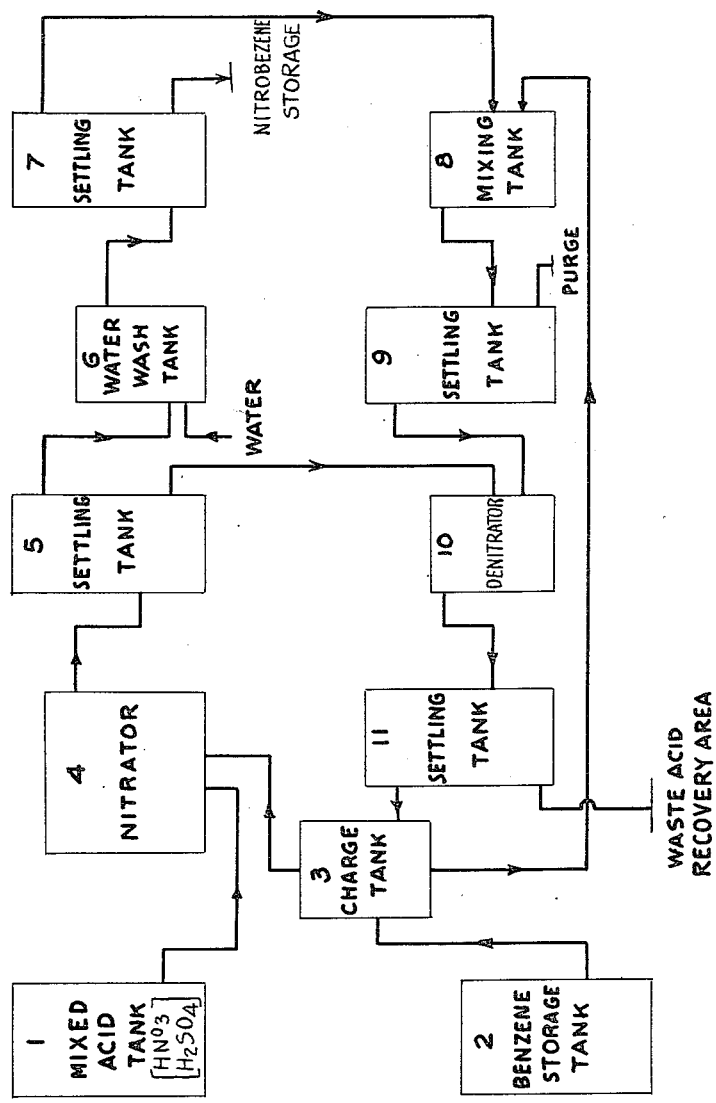
INVENTORS:
LAURENT O. DUBOIS
ROBERT N. GARTSIDE
WINFORD B. JOHNSON and
EDGAR W. SCHNEIDER
BY Thos. A. Wilson
ATTORNEY

United States Patent Office 2,773,911
Patented Dec. 11, 1956

2,773,911

CONTINUOUS MANUFACTURE OF NITROBENZENE

Laurent O. Dubois and Robert N. Gartside, Woodbury, Winford B. Johnson, Wenonah, and Edgar W. Schneider, Woodbury, N. J., assignors to E. I. du Pont de Nemours and Company, Wilmington, Del., a corporation of Delaware Application December 11, 1953, Serial No. 397,528

5 Claims. (Cl. 260—645)

The present invention relates to the manufacture of nitrobenzene. More particularly, this invention relates to the manufacture of nitrobenzene by a continuous process.

Nitrobenzene is manufactured for a number of uses, the primary use being as the intermediate in the preparation of aniline. For many years, nitrobenzene has been produced by introducing a charge of benzene into a nitrator, then slowly feeding in a mixed nitrating acid (nitric acid and sulfuric acid), and thereafter digesting the reaction mixture in the same vessel. Since the addition of the mixed acids requires several hours in order to avoid uncontrollable rises in temperature, and the digestion period requires several more hours, the apparatus used, particularly the nitrator, has to be large in order to provide a high production rate, and constant operator surveillance must be maintained. In addition, an explosion hazard is present at the start of any run due to the large unreacted charge in the nitrator. In order to insure high conversion, it has been the practice to use an excess of the nitrating acid, and the recovery of the unreacted nitric acid presented another problem.

It is, accordingly, an object of the present invention to provide a process for the preparation of nitrobenzene wherein the foregoing disadvantages are eliminated. A further object of the present invention is to provide a process for the preparation of nitrobenzene wherein essentially all of the nitrating acid is consumed. Additional objects will become apparent as the invention is more fully described.

We have found that the foregoing objects may be achieved by preparing nitrobenzene by a continuous process instead of batchwise, and by providing for the treatment of the acids separated from the reaction mixture by benzene to strip out essentially all of the nitric acid, the benzene thus used being introduced into the nitrator along with the dissolved nitrobenzene formed during the treatment.

In order to more fully describe our invention, reference is made to the accompanying flowsheet which illustrates a simple process for the continuous nitration of benzene in accordance with this invention.

In the flowsheet, all of the units are labeled with a descriptive name and the direction of flow from and to each unit is indicated by an arrow in the connecting lines. For simplicity, obvious details such as regulating valves and pumps have been omitted.

The operation of the process represented by the flowsheet is as follows: Mixed acid is fed from tank 1 to the bottom of the nitrator 4 while simultaneously benzene (containing dissolved nitrobenzene after the start of the process) is fed from charge tank 3, also to the bottom of nitrator 4. The nitrator 4 is provided with a conventional agitation means to ensure complete mixing of the reactants. The reaction mixture at the top of nitrator 4, consisting essentially of nitrobenzene, sulfuric acid, water, and some unreacted nitric acid, overflows to the settling tank 5. Since nitrobenzene is essentially non-miscible with the acid-water solution, and of lower specific gravity, it forms the upper layer and continuously overflows to the water wash tank 6 where it is agitated with fresh water. The nitrobenzene-water mixture overflows to settling tank 7 where separation occurs. Since the specific gravity of nitrobenzene is greater than that of the wash water, the relatively pure nitrobenzene is drawn off at the bottom of tank 7 and sent either to storage or for further processing.

The wash water from settling tank 7 overflows to mixing tank 8, where it is agitated with benzene from charge tank 3. Due to the higher solubility of nitrobenzene in benzene over that in water, substantially all of the nitrobenzene will be extracted from the wash water. The mixture from mixing tank 8 overflows to settling tank 9 where the layers separate, the benzene-nitrobenzene solution forming the top layer and overflowing to the denitrator 10. The water from settling tank 9 is purged, preferably to a neutralizing basin.

The residual acids from settling tank 5 are fed into the denitrator 10 also and are there mixed with the benzene solution from settling tank 9. The relatively small quantity of previously unreacted nitric acid is there consumed to form additional nitrobenzene and the entire mixture overflows to the settling tank 11. The sulfuric acid-water solution is drawn from the bottom of settling tank 11 and transported to a waste acid recovery area for reconcentration. The upper layer, consisting of benzene and dissolved nitrobenzene overflows to the charge tank 3 where it is mixed with fresh benzene from the storage tank 2 in the amount required for the continuous charging of nitrator 4.

In actual construction, settling tanks 5, 7, 9, and 11, mixing tanks 6 and 8, and denitrator 10, may all be combined into a single unit with partitions forming the required separations, or they may be combined into two or three units having the required partitions. Such arrangement obviously reduces both the space required and the piping needed. The actual apparatus design is not a part of the present invention, which is, therefore, not limited to any particular arrangement of units.

The greatest amount of reactant recovery occurs at the denitrator 10, and, under some circumstances, it may be unnecessary to include the benzene treatment of the nitrobenzene wash water. Under such operation, tanks 8 and 9 would be omitted, and the benzene from charge tank 3 or storage tank 2 would be fed directly to the denitrator 10. Similarly, it would be completely feasible to feed the benzene solution from settling tank 9 directly to the charge tank 3 and introduce fresh benzene at the denitrator 10, the remainder of the process being as previously described. Another alternative is to introduce the fresh benzene from storage tank 2 at mixing tank 8 and use the solution from this tank for the remaining recovery steps.

The following table illustrates the operation of the nitration stage of the present process using fresh benzene. The purpose of these examples is to demonstrate the range of operating conditions for the nitration of benzene in a continuous process, and the constitution of the reaction mixture leaving the nitrator.

Table 1

| Nitrating acid, percent HNO₃ | Retention time, min. | Nitration temp., °F. | Nitric acid-benzene ratio | NB layer | | | | | Waste-acid layer | | | | Yield, percent |
|---|---|---|---|---|---|---|---|---|---|---|---|---|---|
| | | | | Percent NB[1] | Percent DNB[2] | Unnitrated material, percent | Percent HNO₃ | Percent H₂SO₄ | Percent HNO₃ | Percent H₂SO₄ | Percent NB[1] | Percent DNB[2] | |
| 25.2 | 11.00 | 115 | 0.945 | 94.0 | 0.06 | 1.95 | 3.33 | 0.25 | 1.56 | 73.76 | 1.03 | 0.14 | 99.0 |
| 25.2 | 12.08 | 170 | 0.837 | 97.3 | 0.20 | 0.70 | 1.69 | 0.14 | 1.24 | 73.80 | 0.69 | 0.00 | 91.5 |
| 25.2 | 14.76 | 116 | 0.633 | 88.0 | 0.11 | 10.90 | 0.85 | 0.16 | 0.89 | 72.83 | 0.73 | 0.09 | 85.4 |
| 39.67 | 10.90 | 140 | 0.917 | 95.1 | 0.24 | 0.37 | 4.27 | 0.06 | 2.70 | 72.10 | 0.65 | 0.01 | 99.1 |
| 39.67 | 11.82 | 140 | 0.797 | 96.8 | 0.15 | 0.42 | 2.33 | 0.09 | 1.73 | 72.60 | 0.53 | 0.10 | 95.9 |
| 39.67 | 31.44 | 140 | 0.839 | 98.3 | 0.22 | 0.23 | 1.41 | 0.00 | 0.95 | 72.5 | 0.51 | 0.03 | 92.3 |
| 39.67 | 39.95 | 140 | 0.874 | 92.8 | 0.44 | 0.17 | 2.48 | 0.14 | 1.37 | 71.7 | 0.26 | 0.01 | 92.3 |
| 40.01 | 9.42 | 140 | 0.911 | 93.8 | 0.25 | 0.13 | 5.88 | --- | 3.40 | 69.02 | 1.64 | --- | 97.2 |
| 40.01 | 11.18 | 130 | 1.05 | 89.8 | 0.38 | 0.20 | 7.35 | 0.40 | 3.64 | 71.57 | 1.75 | --- | 99.6 |
| 40.01 | 12.50 | 200 | 0.757 | 93.6 | 0.39 | 5.59 | 0.51 | --- | 0.15 | 72.20 | 1.39 | --- | 100.0 |
| 40.01 | 17.31 | 130 | 1.17 | 87.5 | 0.39 | 0.21 | 11.90 | --- | 5.04 | 71.11 | 0.35 | 1.31 | 96.1 |
| 40.01 | 32.43 | 140 | 0.833 | 95.2 | 0.25 | 1.96 | 2.52 | --- | 1.65 | 70.28 | 0.89 | --- | 100.0 |
| 40.22 | 3.00 | 185 | 0.838 | 95.6 | 0.40 | 1.46 | 2.55 | 0.03 | 2.00 | 72.50 | 0.49 | 0.04 | 97.2 |
| 40.22 | 5.88 | 129 | 0.864 | 91.8 | 0.14 | 4.24 | 3.39 | 0.48 | 3.33 | 71.94 | 1.21 | 0.09 | 95.7 |
| 40.22 | 5.92 | 158 | 0.838 | 95.5 | 0.19 | 1.92 | 2.47 | 0.04 | 2.42 | 71.99 | 0.42 | 0.05 | 98.0 |
| 40.22 | 5.95 | 160 | 0.881 | 95.0 | 0.21 | 2.09 | 2.56 | 0.19 | 0.72 | 72.91 | 0.41 | 0.03 | 96.0 |
| 48.85 | 10.80 | 140 | 0.990 | 90.2 | 0.26 | 0.15 | 9.05 | 0.33 | 5.86 | 68.75 | 0.85 | 0.11 | 99.5 |

[1] Nitrobenzene.  [2] Dinitrobenzene.

The foregoing data illustrate effective nitration of benzene with mixed acid wherein:

(1) The mixed acid contains from approximately 25 to 50% by weight of nitric acid;

(2) The nitric acid to benzene ratio varies from approximately 0.6 to 1.2 to 1;

(3) The nitration temperature is in the range of from 115° F. to 200° F.;

(4) The retention time is varied from 3 minutes to 40 minutes.

The following experiment illustrates an analysis of the flow during several phases of the present process.

| | |
|---|---|
| Nitration temperature _____ ° F__ | 149 |
| Percent HNO₃ in mixed acid_____ | 40 |
| Ratio HNO₃ to benzene_____ | 0.83 |
| Percent HNO₃ in nitrobenzene to tank 6_____ | 4.60 |
| Percent HNO₃ in waste acid to denitrator 10____ | 2.56 |
| Percent nitrobenzene in waste acid to denitrator 10 | 0.81 |
| Percent HNO₃ in nitrobenzene to storage_____ | 0.003 |
| [1] Percent nitrobenzene in benzene from tank 9___ | 6.9 |
| Percent nitrobenzene in waste acid from denitrator 10_____ | nil |
| Percent HNO₃ in waste acid from denitrator 10__ | 0.19 |
| Percent nitrobenzene in purge from tank 9_____ | 0.20 |
| Percent nitrobenzene in benzene from denitrator 10 _____ | 12.36 |

[1] Some nitrobenzene content due to circulation from charge tank 3; the arrangement used did not permit taking benzene samples from the charge tank 3 nor water samples from the settling tank 7.

The present invention has been described fully in the foregoing disclosure, and specific embodiments have been illustrated. We intend, therefore, to be limited only by the following claims.

We claim:

1. A process for the manufacture of nitrobenzene which comprises (1) continuously introducing separately into the bottom of a reaction zone a solution of nitrobenzene in benzene and a mixture of nitric acid and sulfuric acid; (2) continuously removing reaction mixture from the top of said reaction zone and transferring said reaction mixture to a settling zone; (3) continuously removing nitrobenzene from the top of said settling zone and waste mixed acid from the bottom thereof, said waste mixed acid being transferred to a denitrating zone; (4) continuously introducing benzene to said denitrating zone and agitating with said waste mixed acid; (5) continuously transferring mixture from said denitration zone to a settling zone; and (6) continuously withdrawing from the top of said settling zone a solution of nitrobenzene in benzene, said solution thereafter being introduced into said reaction zone.

2. A process as claimed in claim 1, wherein the mixture of nitric acid and sulfuric acid contains from 25 to 50% by weight of nitric acid and from 45 to 62% by weight of sulfuric acid.

3. A process as claimed in claim 1, wherein the ratio of nitric acid to benzene in the reaction zone is from 0.63 to 1.30 by weight.

4. A process as claimed in claim 1, wherein the reaction zone is maintained at a temperature between 115 and 200° F.

5. A process as claimed in claim 1, wherein the nitrobenzene after separation from the waste mixed acid is washed with water, the wash water separated from the washed nitrobenzene and agitated with benzene, the mixture of wash water and benzene containing dissolved nitrobenzene transferred to a settling zone, and the benzene containing dissolved nitrobenzene withdrawn and added to the benzene solution being introduced into said reaction zone.

References Cited in the file of this patent

UNITED STATES PATENTS

| | | |
|---|---|---|
| 1,309,577 | Holmes | July 8, 1919 |
| 2,254,352 | Cloud et al. | Sept. 2, 1941 |
| 2,370,558 | Mares | Feb. 27, 1945 |
| 2,402,180 | Papazoni | June 18, 1946 |
| 2,455,322 | Teeters et al. | Nov. 30, 1948 |